(12) United States Patent
Shan et al.

(10) Patent No.: US 8,185,348 B2
(45) Date of Patent: May 22, 2012

(54) TECHNIQUES FOR MONITORING A DATA STREAM

(75) Inventors: Jerry Z. Shan, Palo Alto, CA (US); Evan R. Kirshenbaum, Mountain View, CA (US); Henri J. Suermondt, Sunnyvale, CA (US); Dirk Beyer, Walnut Creek, CA (US); Chao Chen, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2042 days.

(21) Appl. No.: 10/698,736

(22) Filed: Oct. 31, 2003

(65) Prior Publication Data

US 2005/0096866 A1 May 5, 2005

(51) Int. Cl.
*G06F 17/18* (2006.01)
(52) U.S. Cl. ........................... 702/179; 702/185
(58) Field of Classification Search .................. 702/179, 702/85, 104, 324, 185
See application file for complete search history.

(56) References Cited

U.S. PATENT DOCUMENTS

| | | | | | |
|---|---|---|---|---|---|
| 5,453,749 | A | * | 9/1995 | Morita | 341/118 |
| 5,734,592 | A | * | 3/1998 | Cox et al. | 702/179 |
| 6,107,919 | A | * | 8/2000 | Wilks et al. | 340/511 |
| 2003/0009399 | A1 | * | 1/2003 | Boerner | 705/35 |
| 2003/0171900 | A1 | * | 9/2003 | Desai | 702/190 |
| 2005/0075832 | A1 | * | 4/2005 | Ikeguchi et al. | 702/179 |

OTHER PUBLICATIONS

Fawcett, Tom, Provost, Foster. Activity Monitoring: Notice interesting changes in behavior. Bell Atlantic Science and Technology. 1999.*

Activity Monitoring: Noticing Interesting Changes in Behavior by Tom Fawcett and Foster Provost Copyright 1999 by the Association for Computing Machinery, Inc.

* cited by examiner

*Primary Examiner* — Sujoy Kundu

(57) ABSTRACT

Systems and methods for detecting an interesting event in a data stream. More specifically, a monitoring system is configured to monitor a data stream and establish a sensitivity parameter based on sequences generated from values in a first portion of the data stream. A detector may be trained using the sensitivity parameter to detect the occurrence of an interesting event in the data stream.

30 Claims, 10 Drawing Sheets

TECHNIQUES FOR MONITORING A DATA STREAM

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many different types of systems may be implemented to monitor a data stream including a number of measured values. In systems such as medical systems, environmental systems, and financial markets, for instance, managed computer systems may be implemented to monitor data. A data stream may include measured values representing disk response times, heart rates, sales volumes, or temperatures, for example. In many instances, it may be desirable to monitor a data stream to detect that the system is in a particular state or that particular events, such as changes in the data or changes in some distribution or parameter of the data, have occurred and to activate an alarm upon detection. As can be appreciated, while there may be considerable variations between individual values being measured in a data sequence, when a system is stable, the measured values being monitored may be usefully modeled as having been drawn from a single statistical distribution. In certain instances, changes in the values being monitored by the system or distributions of the data may advantageously be detected by the monitoring system such that some action, such as the raising of an alarm, may be initiated.

One conventional solution to detecting a change in data is to display the measured values statistically or graphically, for example, such that a human observer can monitor the data. Disadvantageously, to implement such a supervised detection system, if the system is monitoring a number of traces, human monitoring may be unreliable and impractical. Further, while a change in the data stream may be statistically significant, the magnitude of the change may be so small that it may be difficult for a human observer to ascertain the change in a reasonably short period of time. This is often the case when considering a change in mean significantly less than the standard deviation of the original distribution, for example. Still further, there are many types of changes that human observers cannot ascertain based on the data stream being monitored. That is to say, it may be desirable to monitor changes that may only be noticeable through data manipulation or transformation. For example, while a human observer may notice a change in the mean or standard deviation of a data stream, the human observer may not be able to detect a change in the standard deviation of the frequency of spikes or zero crossings. Disadvantageously, human observers may not be able to adequately detect changes in certain types of data being monitored by certain computer systems.

Another technique for detecting a change is to implement a programmatic detector. A programmatic detector receives the data and automatically raises an alarm if the data or some distribution or parameter of the data crosses a static threshold. The threshold may be user-selected or factory-selected, for instance. The detector may be configured to trigger the alarm immediately upon receiving a data value (or upon computing a value based on received data values) outside of the threshold, or the detector may produce output correlated with the detector's confidence that a change has actually occurred. As can be appreciated, for these programmatic detectors, threshold and/or confidence levels are generally set manually or automatically before the detector is implemented.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
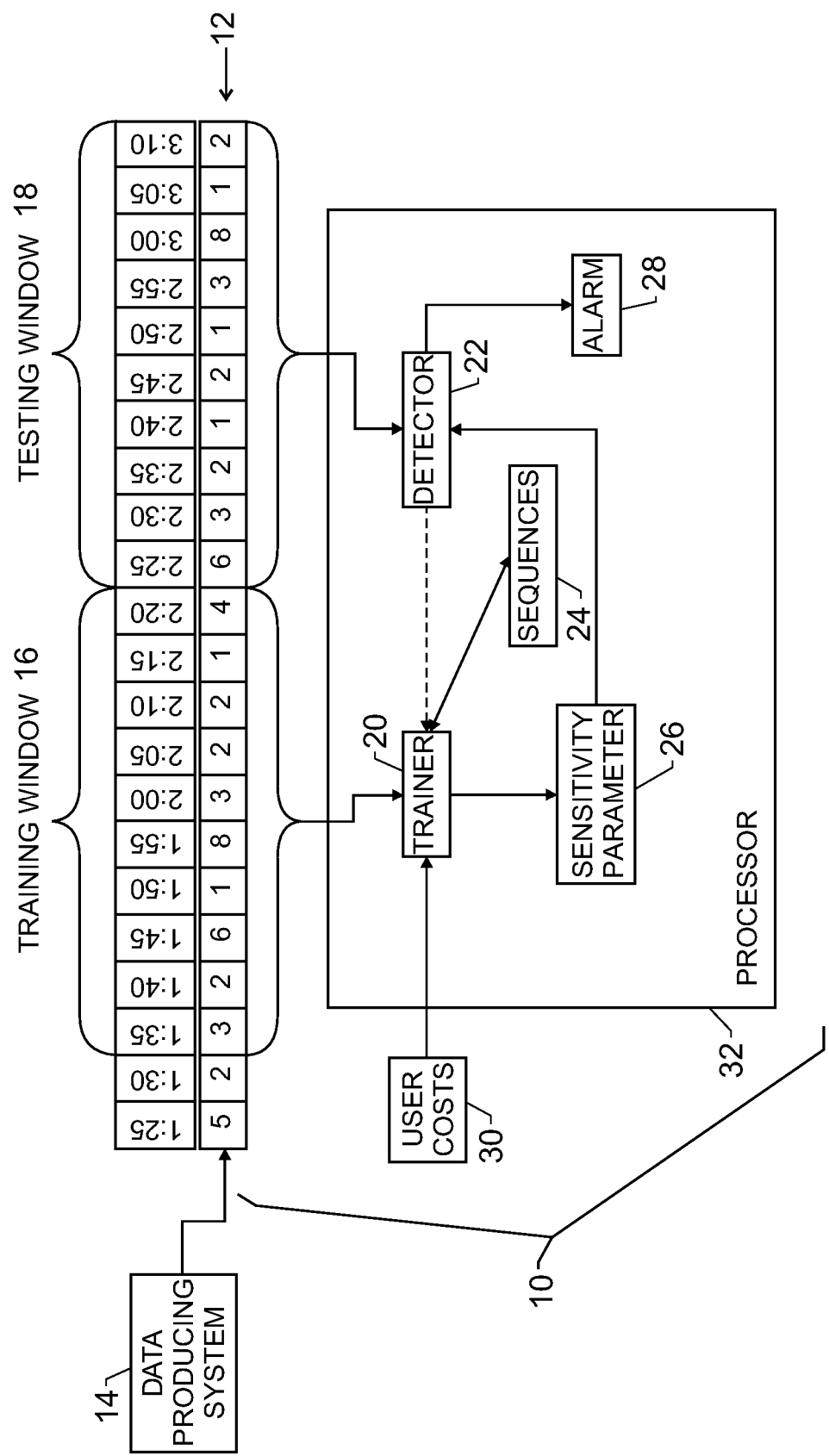
FIG. 1 is a block diagram illustrating an exemplary data monitoring system in accordance with embodiments of the invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As previously described, programmatic detectors may implement a threshold to detect the occurrence of an event, such as a change. One technique for establishing a threshold is to manually set the threshold based on stable, well-understood domains before monitoring any data stream. A system manager, with knowledge of what constitutes "typical" behavior for the sampled data, may set the threshold based on personal observation and subjective intuition. For example, a threshold may be defined by an absolute boundary based on typical data. For instance, if a system is set to monitor human temperature, it might be advantageous to set a threshold around 100° F. Alternatively, thresholds may be based on confidence levels. For instance, if the output of the detector can be reasonably considered as the probability that a change occurred, the system manager may set a threshold at a ninety-five percent probability. That is to say, an alarm will not be raised until the detector has determined that there is a ninety-five percent likelihood that a change has occurred. Expressed another way, the system manager can determine whether the data has changed or remains unchanged and can set a threshold based on his assessment of the likelihood that a change has occurred. For changes in the data, an alarm or notification may be prudent. These types of monitoring systems may generate two types of errors: false positives and false negatives. False positives are cases in which an alarm is raised but in which there is actually no change in the data or data distribution. False negatives are cases in which there is a change in the data distribution, but the score is not high enough to cross the threshold, and therefore, no alarm is raised. While these systems based on manual thresholds may be sufficient for certain applications, for data which demonstrates a greater range of "typical" behavior and thus appears to change more dynamically, as well as those systems which observe data that may be less well-understood, this type of system may be insufficient.

Another technique for establishing a threshold is automatically selecting a threshold. There are many techniques for automatically determining thresholds using historical data with indications of where changes have occurred in the past. If only the accuracy of the detector is relevant, a receiver operating characteristic (ROC) curve may be implemented. As can be appreciated, an ROC curve provides a method for visualizing the sensitivity and specificity which may be used to compare alternative diagnostic tests. More specifically, an ROC curve may be implemented to plot the true positive rate of a change against the false positive rate for every possible threshold value. From the ROC curve, a threshold that maximizes accuracy may be derived. Disadvantageously, these techniques generally require a reasonable amount of labeled data to provide a sufficient number of changes that can be detected. That is to say, the domain from which the data is being monitored generally requires prior characterization based on historical data from the same domain. Historical data is used to characterize "unchanging" data. Thus, before the monitoring of a data stream begins, assumptions are made regarding expected data and/or distributions (based on previously monitored data streams), and those expectations are used to characterize or define the unchanging data. Further, these techniques generally produce a single threshold that may be the best single threshold for use over the entire period covered by the training data. However, it may be advantageous to determine different thresholds for different periods of stability. Still further, there may be costs or benefits associated with detecting (or failing to detect) changes and raising false alarms. By establishing a cost to each true positive, false positive, true negative and false negative and the labeled (previously characterized) data, finding the optimal threshold may become a cost minimization problem.

Further, when monitoring data, it may be desirable to not only detect a change, but also to raise an alarm, or otherwise indicate detection of the change, in a timely manner. That is, the benefit of a true positive may be a function that degrades over time, often culminating at the false negative cost. For linear degradation functions, benefits decrease linearly to the false negative cost over a fixed period of time. In exponential decay functions, a discount factor (a number between zero and one) is multiplied by the excess of the benefit over the false negative cost at each step in the function. As can be appreciated, such functions may also contribute to the difficulties in optimizing one or more thresholds which may be implemented to detect that a system is in a particular state or that particular events, such as changes in the data stream, have occurred.

Turning now to the drawings, and referring initially to FIG. 1, a data monitoring system 10, in accordance with an exemplary embodiment of the present invention, is illustrated. A more specific exemplary embodiment of the data monitoring system 10 will be described with reference to FIG. 2 below. As previously described, it is often advantageous to provide a system that monitors measured data. The monitoring system 10 may be implemented to monitor various types of measured data. Accordingly, the data monitoring system 10 may monitor a data stream 12 from a data producing system 14. As can be appreciated, the type of data producing system 14 will vary depending on the type of data being sampled and the specific application. For instance, the data producing system 14 may be a computer-related system, such as a disk drive, a web server, or a call center. Alternatively, the data producing system 14 may be another physical system such as a city's traffic system, the engine of a car, or a patient in a hospital. Still further, the data producing system 14 may be a more abstract system such as the stock market or a citation index.

Regardless of the system type, the data producing system 14 produces a data stream 12. As used herein, the data stream 12 refers to a sequence of temporally ordered data values. In an alternative embodiment, the data stream 12 may refer to multiple temporally ordered data values. For instance, the data stream 12 might represent the average throughput on a disk, the average load on a web server, the call volume of a call center, the number of cars through a particular intersection, the current draw of the engine, the blood pressure of a patient, the price or volume of transactions on a particular stock, the number of times a paper on a given subject is cited, or any other type of measured data. In the present exemplary embodiment, the data stream 12 is sampled at uniform intervals and is time stamped. As illustrated in FIG. 1, each sample from the data stream 12 is sampled and marked at five minute intervals. As can be appreciated, depending on the data producing system 14, the individual samples in the data stream 12 may not be time stamped and may not be sampled at uniform intervals. The granularity of the data stream 12 can range from microseconds (or less) to years (or more). More specifically, the granularity of the data stream 12 may have a granularity of between milliseconds and days.

The monitoring system 10 may be independent from the data producing system 14, as illustrated in FIG. 1. Alternatively, the monitoring system 10 may be integrated with the data producing system 14. Further, while the monitoring system 10 is described as monitoring data as it is sampled by the data producing system 14, in an alternate embodiment the monitoring system 10 may monitor previously collected data. The data may be temporarily stored in the data producing system and subsequently delivered to the data monitoring system 10 sequentially, with or without a time stamp. The data stream 12 may comprise a number of sampled values or it may comprise transformations of the sampled data. For instance, the data stream 12 may be averages of values over the interval from the last data point. Alternatively, the difference between successive points may be calculated by the data producing system 14 and delivered to the monitoring system 10. In another exemplary embodiment, the frequency of a statistical event, such as the occurrence of a point more than two standard deviations from the mean of sampled data may be calculated and delivered to the monitoring system 10.

Further, the data stream 12 may comprise a sequence of data, wherein the originally sampled data has been transformed by smoothing, aggregation, interpolation, outlier elimination, or seasonal detrending, for instance. Smoothing generally refers to replacing each sampled data point by a function of its neighboring points (either prior data points or data points on both sides). Typically, this will be a moving average of the most recent points or of points in some temporal interval.

Aggregation generally refers to partitioning the sampled sequence of data into subsequences of typically equal length (either in time or number of points) and replacing each subsequence (as a single point) by some computed value, such as the average or maximum. Another type of aggregation uses the count of sampled data points in a time-defined subsequence. This transforms the data stream from the original domain into the frequency domain.

Interpolation refers to placing missing data values by a function neighboring values. In other words, points other than those originally sampled will be generated. This might simply be the moving average or might involve drawing a point from the calculated recent distribution.

Outlier elimination refers to removing points that are considered likely to be errors that are likely to disadvantageously bias the result. A simple approach for statistically normal data is to remove any point that is more than a predetermined number of observed standard deviations above the observed mean. This may be problematic for change detection, as such a jump relative to the prior distribution may be a change that is desirable to detect (as discussed further below). Once outliers have been eliminated, new values will typically be interpolated.

In certain applications, seasonal trends and peak periods can be taken into account by "detrending" the sampled data. For instance, if the data stream 12 being observed by the monitoring system 10 comprises disk access rates at a corporation, the access rate may regularly and predictably show an increase at certain times of the day (e.g., 9:00 am). Such a change may be considered part of the expected behavior of the system, and indeed, a failure to rise might be considered an event worthy of note. To avoid the detector 22 raising the alarm 28 upon seeing this expected change, the data stream 12 may be constructed from the sampled data by computing the difference between the sampled data and data sampled at saliently "the same time" in other periods in the past.

Referring again to FIG. 1, the data stream 12 is partitioned into a training window 16 and a testing window 18. In the present exemplary embodiment, the training window 16 and testing window 18 are adjacent and non-overlapping. Alternatively, the training window 16 and the testing window 18 may partially or completely overlap or there may be a gap between them. The partitioning of the data stream 12 and implementation of the training window 16 and the testing window 18 will be discussed further below with reference to FIGS. 7-10.

The training window 16 is defined herein as a contiguous portion of the data stream 12 that is used to train a detector 22 configured to detect something notable or interesting about the data stream 12, such as a change. The training window 16 may be implemented as, for example, a buffer or pointers to the beginning and end of a region of the data stream 12. A trainer 20 uses the data in the training window 16 to generate a number of sequences 24 and uses the sequences 24 to determine an optimal value for a sensitivity parameter 26 to be used to parameterize a detector 22. The sensitivity parameter 26 might be a threshold, establishing a level that is used to trigger an alarm 28 if the monitored data, or some transformation of the monitored data computed by the detector 22, reaches the value of the sensitivity parameter 26. Alternatively, the sensitivity parameter 26 should be used to control the behavior of the detector 22 by setting a maximum number of iterations or maximum polynomial degree, for instance. The sensitivity parameter 26 may be at least reasonably monotonic. That is, larger (or smaller) values should tend to make the detector 22 more likely to signal detection given the same input data.

The value established for the sensitivity parameter 26 is then delivered to the detector 22 such that the detector 22 can use the sensitivity parameter 26 to determine whether the data in the testing window 18 is such that the detector 22 should signal detection. By establishing a value for the sensitivity parameter 26 and setting the detector 22 to detect changes correlative to the sensitivity parameter 26, the detector 22 is "trained."

The trainer 20 may also use external parameters, such as user cost parameters 30, to determine the optimal value for the sensitivity parameter 26. For instance, the trainer 20 may make use of a target false positive rate, costs associated with detecting a false positive or costs associated with the delayed detection of a true positive. The generation of the sequences 24 and the training of the detector 22 will be described further with respect to FIGS. 2 and 3 below.

As discussed further below, all of the data in the training window 16 is assumed to be "uninteresting" or "unchanging." As used herein, "uninteresting data" or "unchanging data" is data for which the alarm 28 should not be raised (i.e., a change is not noteworthy). If the detector 22 is implemented to detect a change in distribution, "uninteresting data" or "unchanging data" is assumed to be data that is sampled from a stable distribution. As will be appreciated through the discussion below, the validity of this assumption is inconsequential. That is, in some embodiments in which there is overlap between the data in the training window 16 and the data in the testing window 18 or in which the training window 16 may not be emptied following the detection of a change, the training window 16 may in fact contain a change in distribution. However, the exemplary embodiments of the data monitoring system 10 operate under the assumption that this is not the case. These points will be further clarified in the description below.

Once one or more initial values for the sensitivity parameters 26 are established, data from the data stream 12 contained within the testing window 18 is monitored by the detector 22. That is to say that once an initial value for the sensitivity parameter 26 is established using the sequences 24 generated from the data in the training window 16, the detector 22, parameterized by the sensitivity parameter 26, monitors the data contained within the testing window 18 to determine whether the data in the testing window 18 should be considered to contain the sort of event or exemplify the sort of property the detector 22 is designed to detect. The testing window 18 is a contiguous portion of the data stream 12 that contains data to be tested. As with the training window 16, the testing window 18 may be implemented as, for example, a buffer or pointers to the beginning and end of a region of the data stream. As described further below, the data in the testing window 18 can be described as one or more sequences that may be monitored by the detector 22, such that something, such as a change in the data or a change in a transformation of the data, may be detected.

As can be appreciated, the detector 22 is configured to detect "something" in the data stream 12. That is to say, the detector 22 is configured to monitor the data stream 12 to detect something of interest, such as the occurrence or non-occurrence of a notable event or the implication that the data producing system 14 is in a state of interest. Most commonly, the detector 22 will be configured to detect that a salient change has occurred in the data stream 12 either that a salient change occurred within the testing window 18 or that the data contained in the testing window 18 is saliently different from the data contained in the training window 16. In one embodiment, the detector 22 compares a value or score computed based on the data in the testing window 18 to the value for the sensitivity parameter 26 established by the trainer 20. If the computed value is greater than (or alternatively, less than) the value for the sensitivity parameter 26 set by the trainer 20 based on the data in the training window 16, the alarm 28 may be triggered. A more specific embodiment of a detector 22 and the detection of changes in the data stream 12 will be illustrated and described with reference to FIG. 3.

The alarm 28 may be configured to provide a visual or audible signal to a user, for instance, indicating that the detector 22 has signaled detection. Alternatively, the alarm 28 may be configured to note and/or catalog any changes that are detected in the normal distribution of the data. Still further, the alarm 28 may be configured to have different alarm levels. For instance, if the sensitivity parameter 26 is a threshold and the detector 22 determines that the data in the testing window 18 is slightly over the value established for the sensitivity parameter 26, a low-level indicator may be raised by the alarm 28. If the data in the testing window 18 is moderately higher than the value established for the sensitivity parameter 26, a mid-level indicator may be raised by the alarm 28. If the data in the testing window 18 is significantly higher than the value established for the sensitivity parameter 26, the alarm 28 may be configured to initiate a high level indicator. Alternatively, the different alarm levels may correspond to different values of the sensitivity parameter 26, each independently chosen by the method described below corresponding to different user-supplied parameters. The type and configuration of each of the detector 22 and the alarm 28 may vary depending on the type of data being monitored and the requirements of those using the monitoring system 10.

In another embodiment, the effect of raising the alarm 28 may be to affect the behavior of the data producing system 14 or some other system or to cause some entity to take some action. Examples of such responses might be to shut down the system, take a system off-line, deploy an emergency response mechanism such as a sprinkler system, place a service call, cause a system to enter a "debug" state, trigger the sale of a lot of stock, or trigger the collection of data about the current state of the system for later diagnosis, for instance.

In some embodiments it may not be desirable to raise the alarm 28 the first time the detector 22 signals detection. In such embodiments, the alarm 28 may be delayed until the detector 22 has signaled detection a specified number of times within a specified time period. These parameters may be a function of the type of alarm 28 or the asserted magnitude of the change being detected. A sufficiently large change might not require as much support or, conversely, a change which will trigger an especially disruptive alarm might require more support.

As used herein, "an alarm 28" having associated sensitivity levels 26 and behavior may refer to multiple alarms 28, each having an associated set of sensitivity levels 26 and behavior. Thus, there may be one alarm 28 which, when raised, alerts a user, while a second, independent alarm 28, when raised, triggers the collection of a data snapshot, for instance.

The monitoring system 10 may operate under the control of a processor 32, such as a microprocessor. The processor 32 may comprise an independent device or chip, or the trainer 20 and/or the detector 22 may be integrated into the processor 32, as in the present exemplary embodiment illustrated in FIG. 1. As can be appreciated, the processor 32 generally controls the functionality of each of the components of the monitoring system 10 by implementing algorithms, programs and instruction sets. Further, the processor 32 may also facilitate desirable mathematical operations that may be implemented in the monitoring system 10 to produce parametric data or transformations in the data stream 12. Accordingly, the trainer 20 or the detector 22 may be configured to facilitate any desirable mathematical operations and permutations of the data stream 12.

As can be appreciated, the monitoring system 10 is domain independent and therefore may be implemented to automatically monitor any stream of sample data, regardless of data type, such that changes in the data stream 12 may be detected and noted. As previously described, automated data monitoring systems do not typically rely upon previously characterized data to establish values for sensitivity parameters such as thresholds. However, if the automated data monitoring systems do implement previously observed data, the systems may implement historical data and previously detected data anomalies, as well as external parameters such as the user cost parameters 30, to establish values for sensitivity parameters 26 that may be compared to the data in the testing window 18 to determine whether the data falls within the acceptable levels. The historical data is often data collected from other systems and assumed to be similar to the new system in which it is being implemented to establish values for sensitivity parameters 26. As can be appreciated, this assumption may be incorrect and may ultimately lead to a less efficient data monitoring system. Further, if historical data is implemented at all, it is generally implemented off-line, rather than on-line during data monitoring. Advantageously, the monitoring system 10 is unsupervised and does not require the use of historical data to characterize the sensitivity parameter, thereby providing a domain independent system. As will be discussed further below, the monitoring system 10 may use historical data in conjunction with the presently described techniques to further optimize the monitoring system 10.

Figure 2:
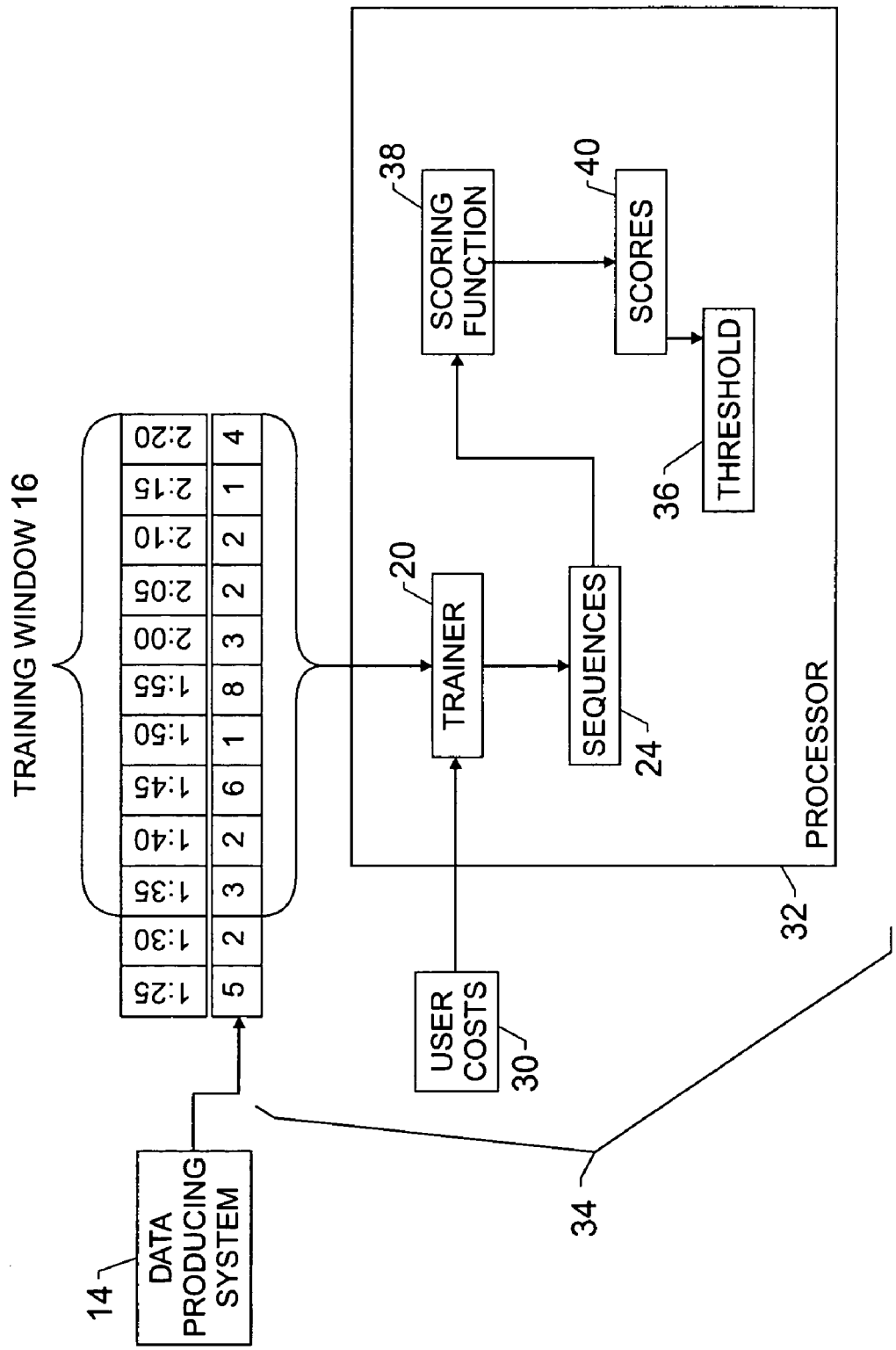
FIG. 2 is a block diagram illustrating exemplary embodiments of the training functions of a data monitoring system.
Figure 3:
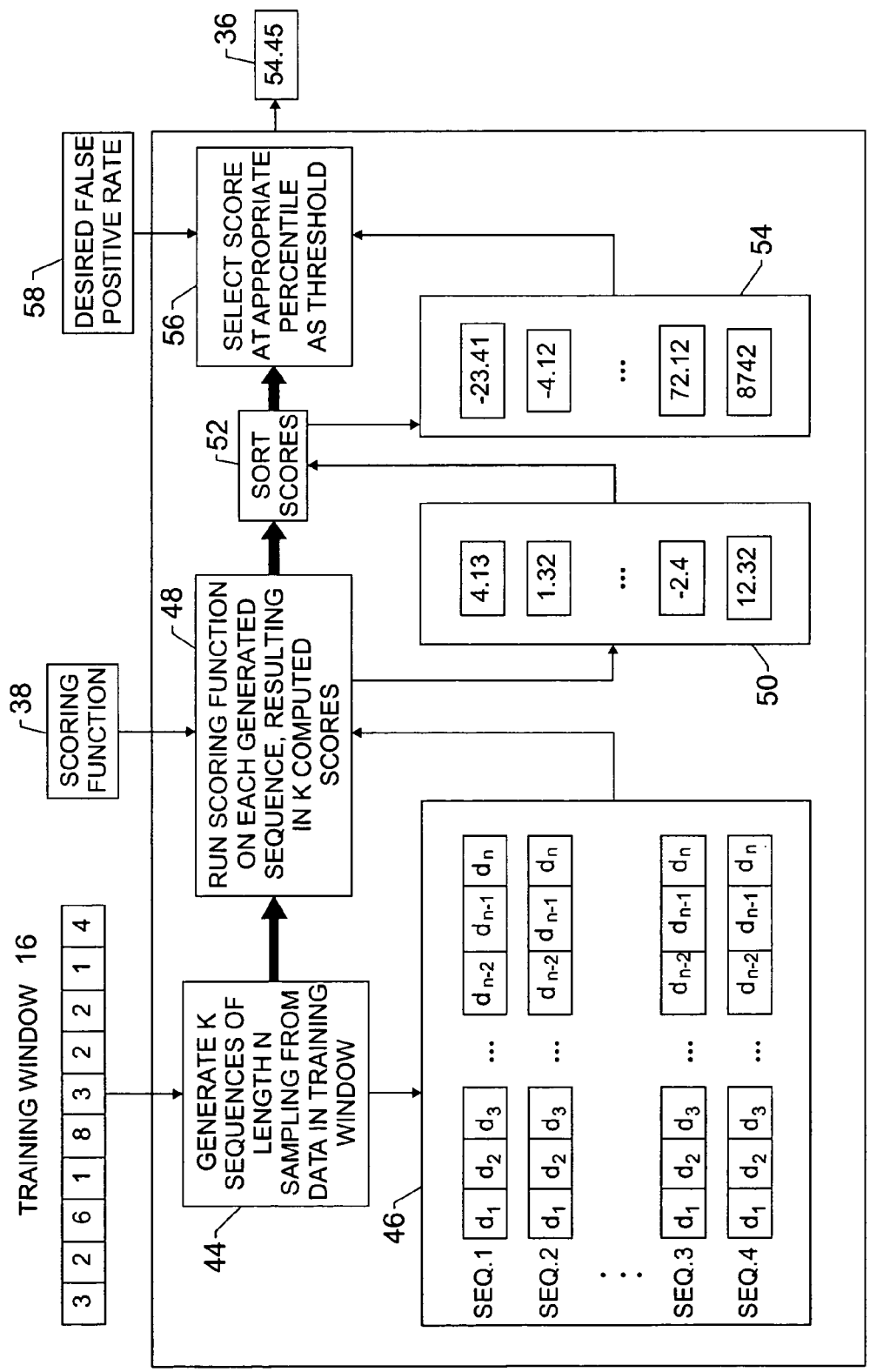
FIG. 3 is a block diagram illustrating exemplary techniques for training the data monitoring system in accordance with embodiments of the invention.

Referring now to FIGS. 2 and 3, the training period of the data monitoring system 10 is described. The training period includes the generation of the sequences 24 and the selection of a threshold 36 which will be used comparatively to determine whether a change in subsequent data has occurred. Specifically, FIG. 2 illustrates a more specific embodiment of the portion of the data monitoring system 10 of FIG. 1, indicated here as the data monitoring system 34, relevant to the training period. For simplicity, like reference numerals have been used to indicate features previously described with respect to FIG. 1. FIG. 3 is a block diagram further illustrating the steps implemented during the training period. FIGS. 2 and 3 will be described in together.

Referring initially to FIG. 2, the data monitoring system 34 includes a trainer 20 configured to set a threshold 36 that will be used to determine whether the data in the testing window 18 contains a salient change or is saliently different from the data that precedes it in data stream 12. As previously described, to determine a value for a sensitivity parameter 26, such as the threshold 36, the trainer 20 generates a number of sequences 24. As can be appreciated, increasing the number of data points and generating a number of sequences used to determine the threshold 36 increases the reliability and validity of the threshold 36. The data monitoring system 34 further includes a more specific embodiment of the detector 22, having a scoring function 38. Generally, the scoring function 38 is an algorithm that takes a sequence of data points from either the testing window 18 (during testing) or from sequences 24 generated based on the training window 16 (during training) and computes a score for the sequence.

During the training period, the scoring function 38 receives the sequences 24 generated from the data in the training window 16 and computes, for each, a score 40. The score 40 may be, for example, the maximum value in the corresponding sequence 24 generated from the data in the training window 16, a statistical parameter of the sequence 24, or a more complex value such as the value computed by a Cumulative Sum (CUSUM) algorithm on the sequence 24.

Referring now to FIG. 3, the generation of the sequences 24 and the selection of the threshold 36 is further illustrated. As previously described, the trainer 20 receives data from the training window 16. The data in the training window 16 is assumed to be unchanging or uninteresting and to have been drawn from some statistical distribution. While this actual distribution from which the data in the training window 16 was drawn is likely to be unknown, in one exemplary embodiment, the trainer 20 may infer a statistical distribution of a known type that appears to model the data in the training window 16, and this inferred statistical distribution may be used to generate the sequences 24. Accordingly, any sequences 24 generated from the data in the training window 16 can be said to come from the same statistical distribution and therefore also be unchanging or uninteresting. To increase the reliability and validity of the threshold 36 the trainer 20 generates a number of sequences 24. Specifically, the trainer 20 will generate k sequences 24 of length n. In the exemplary embodiment being described, the statistical distribution is assumed to be a discrete distribution containing all of the data values actually seen in the training window 16. Further, the distribution includes only data values that are actually present in the training window 16 and includes them at the frequencies in which they appear in the training window. Still further, the elements are assumed to be independently drawn. The sequences 24 are therefore generated by sampling the data from the training window 16, as indicated in blocks 44 and 46 of FIG. 3. It will be apparent that the numbers k and n need not be invariant and different generated sequences 24 may have different lengths.

To generate the sequences 24, as indicated in blocks 44 and 46, the values in the training window 16 may be randomly selected, with replacement, with each value having the same probability of being selected. As can be appreciated, "with replacement" refers to drawing a value from the training window 16 and then returning the value to the training window 16 such that it has an equal probability of being selected from the training window 16 again. For instance, each sequence 24 may be generated by randomly selecting 100 data points from the training window 16. This process may be repeated 1000 times, for example, to generate 1000 sequences 24. Alternatively, sequences 24 may be generated using a statistical parameter of the data in the training window 16, such as a mean and/or standard deviation of the data. Still further, the data in the training window 16 may be sorted by order of magnitude and the sequences 24 may be generated by using linear or nonlinear interpolation to generate additional data to be used in the sequences 24. As can be appreciated, sampling without replacement may also be implemented to generate the sequences 24, although the number of data points in the sequences 24 may then be limited by the number of data points in the training window 16. Generating sequences by sampling from observed values, either with or without replacement, may be referred to as "bootstrapping," as can be appreciated by those skilled in the art.

As can be appreciated, various other techniques may be implemented to characterize the statistical distribution used to generate additional sequences 24 from the data in the training window 16. For instance, kernel density estimation techniques may be implemented to compute a continuous distribution. Alternatively, the data in the training window 16 may be sorted by magnitude and linear or non-linear interpolation may be used to obtain a continuous distribution. Further, the distribution of data in the training window 16 can be characterized by a parameterization of a parametric statistical distribution such as a Gaussian distribution, a Poisson distribution or an ARIMA distribution, by computing the appropriate parameters (e.g., mean and standard deviation in the case of a Gaussian distribution) of the distribution. In some embodiments, several statistical models may be tried and the one that appears to generate the "best fit" used.

Once the sequences 24 are generated, the scoring function 38 may be implemented to compute a score 40 for each of the sequences 24, as indicated in blocks 48 and 50 of FIG. 3. As previously described, the score 40 may simply comprise any percentile value, such as the $95^{th}$ percentile or the maximum value, in each of the sequences 24. Alternatively, the score 40 may comprise the output of a statistical test such as a cumulative sum (CUSUM) algorithm, an exponential moving average or a Wilcoxon rank sum test, for example.

In some cases, it is possible for the value computed by the scoring function 38 for an entire sequence 24 to be less than the value returned for some subsequence that would have been presented (given buffer management constraints of maximum and minimum sizes for the testing window 18) to the detector 22 as a testing window 18. When computing the false positive rate (discussed further below), it is advantageous for the score 40 to be the maximum of the values that would be returned by the scoring function 38. Just above this number will be the lowest setting of the threshold 36 that would fail to cause the detector 22 to erroneously signal detection if the sequence 24 was part of the data stream 12.

Regardless of the type of scoring function 38 implemented and the particular score 40 generated, a score 40 is computed for each sequence 24. The scores 40 may then be sorted by order of magnitude, for instance, as indicated in blocks 52 and 54. By sorting the scores by order of magnitude, a false positive rate may be estimated for various potential values of the threshold 36. As used herein, a "false positive" corresponds to a condition in which an alarm 28 is raised, but in which there is no change in the data. That is to say, a false positive is a condition in which a change was indicated to have occurred in unchanging data. Since all of the sequences 24 are assumed to be uninteresting, any sequence 24 whose associated score 40 is such that it is considered to be on the "interesting" side of a threshold would be considered a false positive.

Accordingly, in the present exemplary embodiment, the selection of the threshold 36, indicated in block 56, may be made by considering a user-supplied highest tolerable false positive rate, as indicated in block 58. By way of example, if the highest tolerable false positive rate is 5% per hour (i.e., one false positive every 20 hours), and each of the sequences 24 represents one hour of data, then the threshold 36 may be determined by selecting the sorted score corresponding to the $95^{th}$ percentile of the scores 40. This value is such that 5% (50) of the 1,000 sequences 24 had associated scores 40 that exceed it, and therefore 5% of the simulated hours would contain a false positive. The other 95% (950) of the sequences 24 had associated scores 40 that fall below the selected threshold 36 and thus represent hours that would, correctly, go unnoticed or undetected. If the number of generated sequences 24 is insufficient to specifically identify the desired percentile, interpolation may be used. In the present exemplary embodiment, the score corresponding to the highest tolerable false positive rate is equal to "54.54." Accordingly, the threshold 36 is set at 54.54, as indicated in FIG. 3. As can be appreciated, other factors such as false negative rate may be implemented to select the threshold 36, as described further below.

Alternatively, rather than sorting the scores and selecting the score with the highest tolerable false positive rate from the sorted scores, a binary search through possible thresholds 36 may be implemented to find the score representing a target false positive rate. Initially, a hypothetical threshold 36 may be selected and sequences 24 may be generated to estimate the false positive rate using this threshold 36. Once two thresholds 36 that bracketed the target rate are determined, a binary search may be performed, repeatedly bisecting the bracketed region and adjusting it based on which side of the midpoint's false positive rate the target false positive rate is found.

As can be appreciated, similar techniques may be used to obtain a threshold that matches other targets for characteristics of the performance of the detector 22, such as a highest tolerable false negative rate, a lowest tolerable true positive rate, a highest tolerable expected detection delay, a lowest tolerable accuracy, a lowest tolerable precision, or a lowest tolerable recall, where these performance characteristics are known to those with skill in the art. As can also be appreciated, these techniques may be used to obtain values for sensitivity parameters 26 which are not thresholds 36; but which are used by the detector 22 to alter its behavior.

In some applications, it may be desirable to consider some changes from the statistical distribution inferred to characterize the data in the training window 16 to also be "uninteresting," or rather to be a change not worth detecting. As an example, if a Gaussian distribution with a particular mean and standard deviation is inferred to characterize the data in the training window 16, and the detector 22 is configured to detect a change in the mean, it may be determined a priori that a change in the mean whose magnitude is less than one quarter of a standard deviation is not worth considering to be a change. Accordingly, when generating the sequences 24, it may be desirable to inject an uninteresting change, as described further below with reference to FIGS. 4 and 5.

Figure 4:
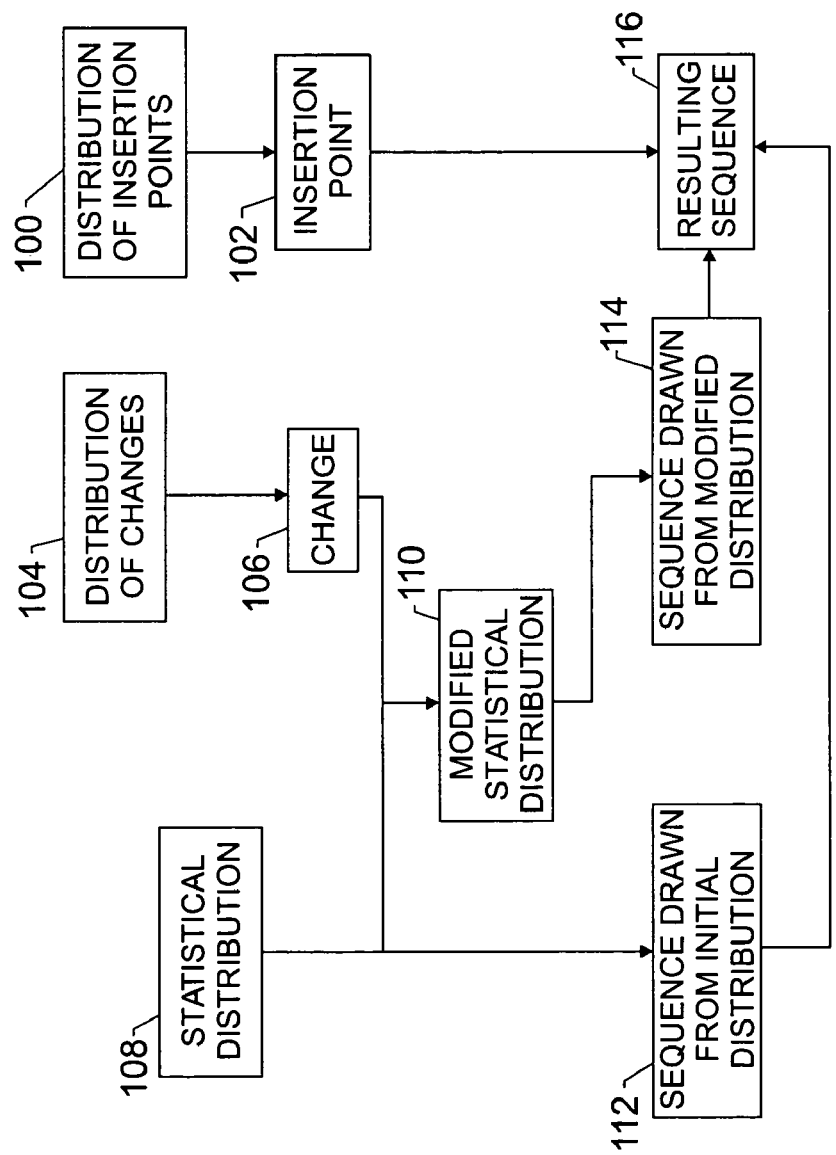
FIG. 4 is a block diagram illustrating exemplary embodiments of techniques for injecting changes to train a detector in accordance with embodiments of the present invention.

Referring now to FIG. 4, a block diagram of an exemplary technique for generating a sequence 24 having a change is illustrated. As illustrated in FIG. 4, a distribution of insertion points 100 is used to obtain an insertion point 102, which determines where in the sequence 24 the change from one stable distribution to another stable distribution should occur. In some embodiments, this may be a fixed number. The numbers drawn from the distribution of changes 104 represent changes 106 to be made to the statistical distribution 108. The distribution of changes 104 may be based on the statistical distribution 108 or on some other computable properties of the data contained in the training window 16 which are not reflected in the statistical distribution 108. In the present example, the distribution of changes 104 may be a uniform distribution of changes to the mean ranging from zero to 0.25 standard deviations, and the distribution of insertion points 100 may be a uniform distribution between point 50 and point 75, for instance. A particular change 106 drawn from this distribution 104 may be 0.21, resulting in a change in mean of 0.21 standard deviations. If the current observed standard deviation is 2, then the change to the mean would be 0.42. The distribution of changes 104 may take any form and need not be of the same form as the statistical distribution 108 used to characterize the data in the training window 16. The distribution of changes 104 may also be implemented as several distributions, with a separate multinomial distribution used to select between them, as can be appreciated by those skilled in the art.

A modified distribution 110 is computed from the statistical distribution 108 and the change 106. To continue the example, if the statistical distribution 108 was a normal distribution with mean of 10.5, the modified distribution 110 would be a normal distribution with mean of 10.92 and standard deviation of 2. Two sequences 112 and 114 are then generated, one from the original statistical distribution 108 and one from the modified statistical distribution 110, and the two sequences 112 and 114 are merged to form a resulting sequence 116. The resulting sequence is formed such that values are taken from the first sequence 112 up to the insertion point 102 and from the second sequence 114 afterward to form the resulting sequence 116. As can be appreciated, the resulting sequence 116 can be used to train the detector 22.

Figure 5:
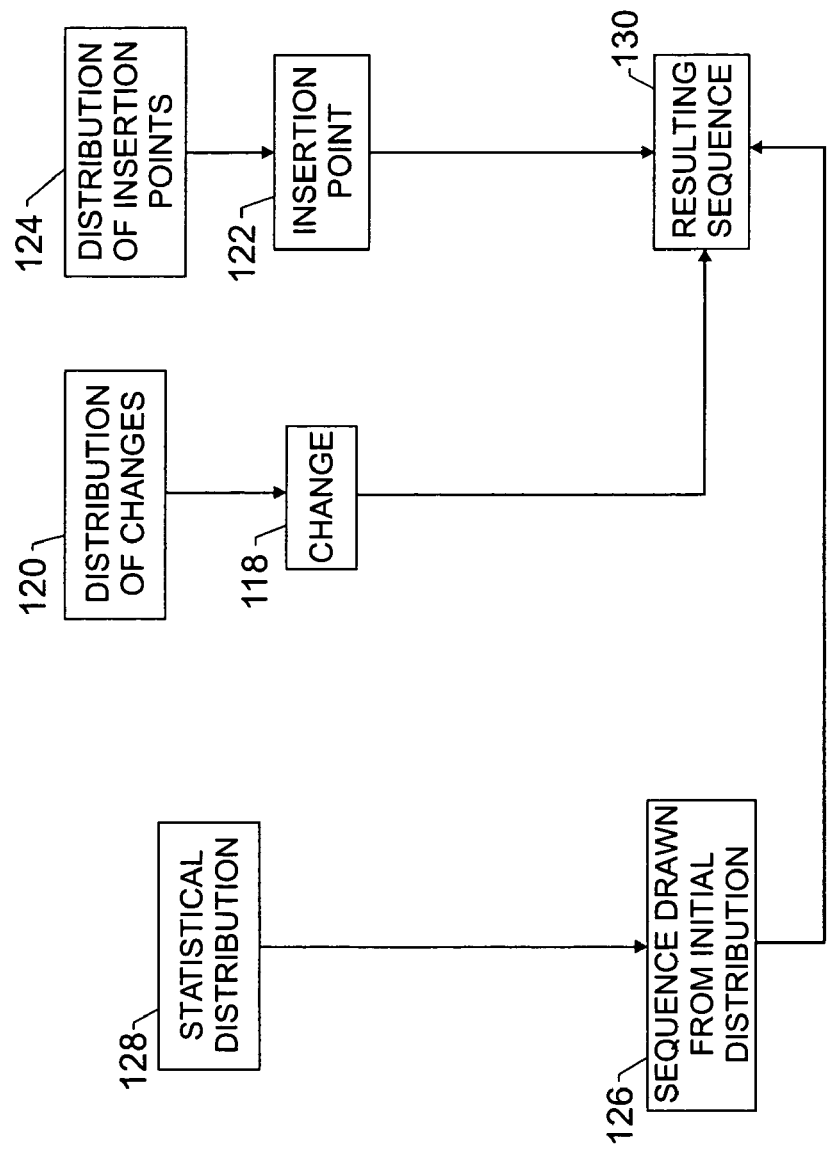
FIG. 5 is a block diagram illustrating further exemplary embodiments of techniques for injecting changes to train a detector in accordance with embodiments of the present invention.

FIG. 5 illustrates a more specific embodiment of the technique illustrated with reference to FIG. 4, wherein the desired change comprises a change in mean (which can be modeled as an addition to each of the generated points) or a scaling (which can be modeled as a multiplication of each of the points). Here, a change 118 is generated from the distribution of changes 120 and an insertion point 122 is generated from the distribution of insertion points 124, but only one sequence 126 is generated from the original statistical distribution 128. The resulting sequence 128 is computed by adding the change to each of the points in the generated sequence 126 (or multiplying each of the points by the change) following the insertion point 122.

In another embodiment, the insertion point describes a change that arises gradually and comprises two points, one for the beginning of the change and one for the end. In such an embodiment, the points in the resulting sequence 116, 130 represent points drawn from a distribution that can be thought of as either being drawn from the modified distribution with increasing probability or (with different meaning) being drawn from a distribution which reflects a partial change. For the latter embodiment, it may be necessary to construct multiple intermediate modified distributions, one for each generated point between no change and the full selected change, as can be appreciated by those skilled in the art.

Figure 6:
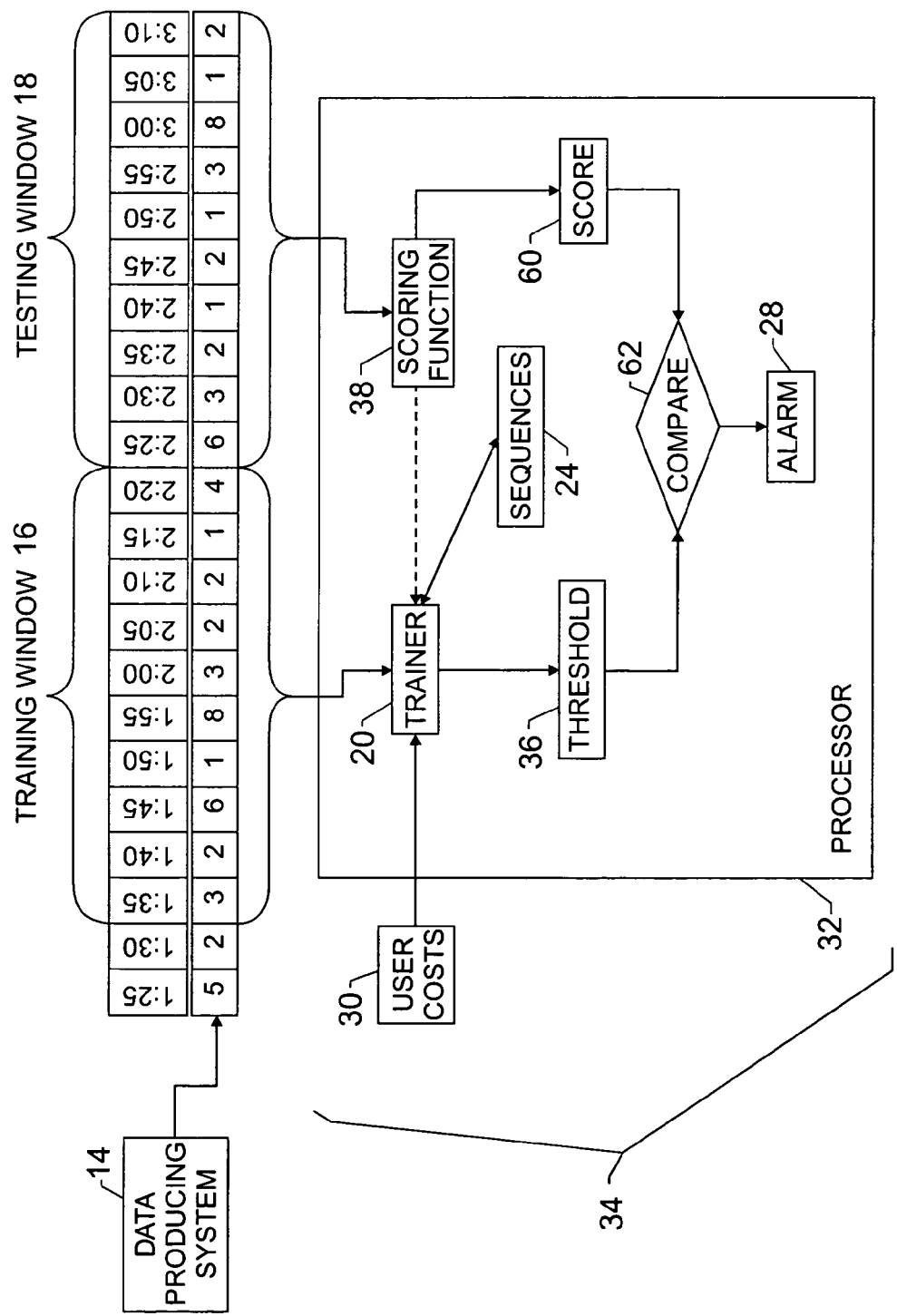
FIG. 6 is a block diagram illustrating exemplary embodiments of the training functions of a data monitoring system.

Once the threshold 36 has been established, the scoring function 38 may be used to test the data in the testing window 18 to determine whether the data in the testing window 18 reflects a change. FIG. 6 illustrates additional exemplary elements of the data monitoring system 34 which may be implemented to detect a change in the data in the testing window 18. As previously described, the scoring function 38 is implemented in conjunction with the sequences 24 generated from the data in the training window 16 to generate a number of scores to determine the threshold 36. Once the threshold 36 is determined, the scoring function 38 generates a score 60 for the sequence of data in the testing window 18. The score 60, corresponding to the data in the testing window 18, may then be compared to the threshold 36 as indicated in block 62 of FIG. 6. If the score 60 exceed the threshold 36, the alarm 24 will be raised. As can be appreciated, while the detector 22 is not indicated in FIG. 6, the scoring function 38, as well as the compare function 62 are part of the detector 22.

Figure 7:
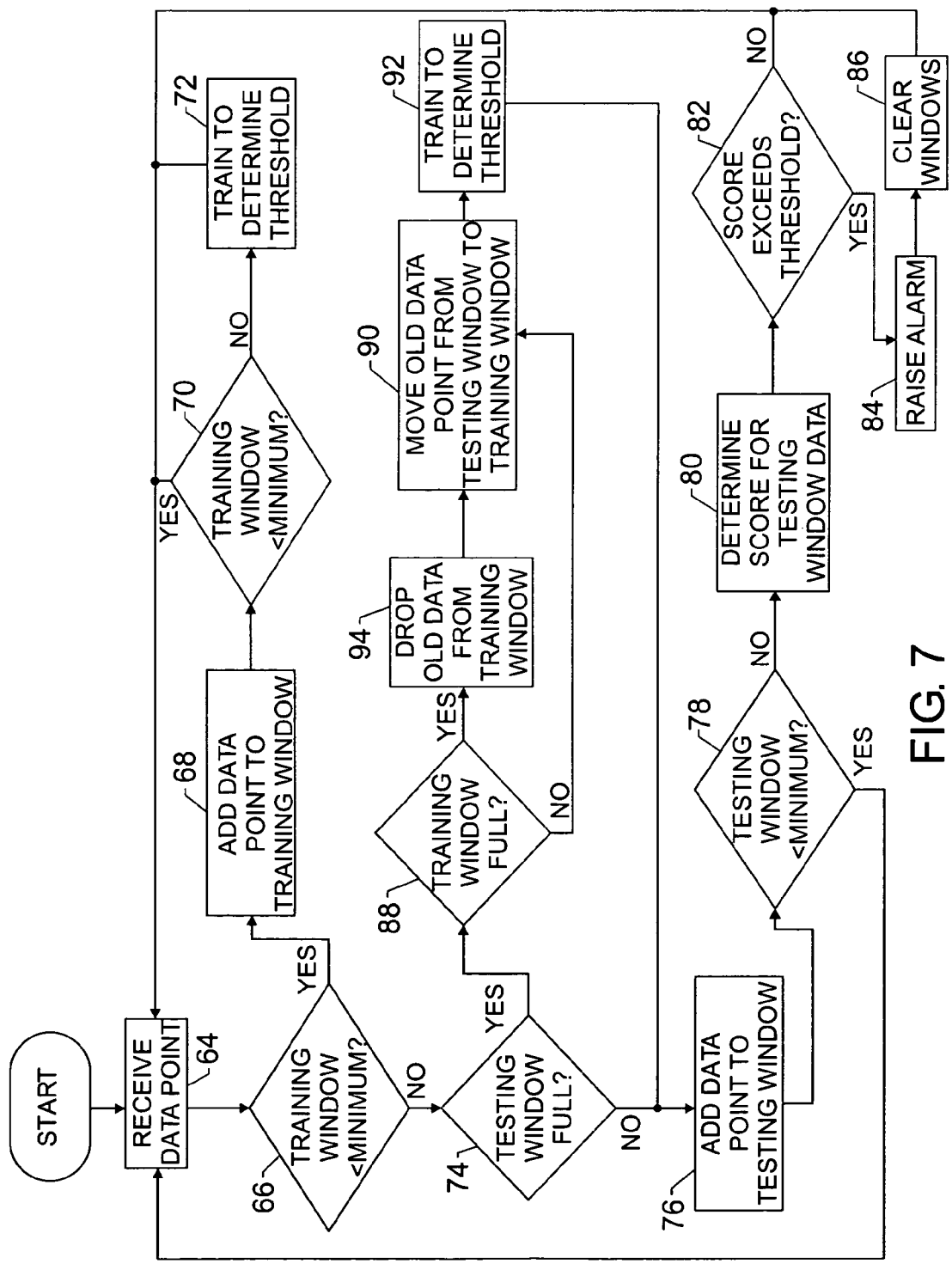
FIG. 7 is a flow chart illustrating an exemplary data management scheme in accordance with one embodiment of the invention.
Figure 8:
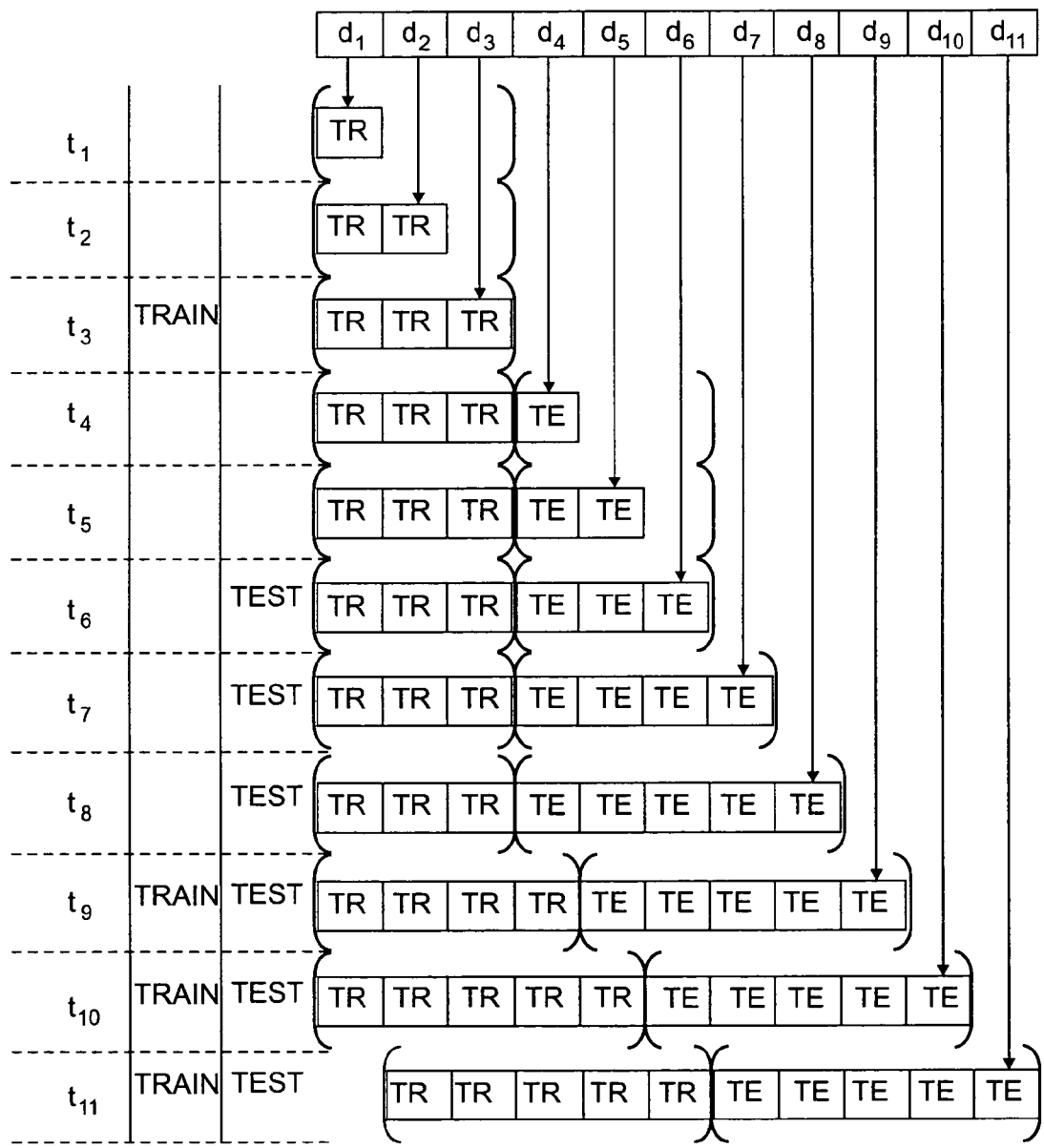
FIG. 8 is a timing diagram illustrating the exemplary data management scheme indicated in FIG. 7.
Figure 9:
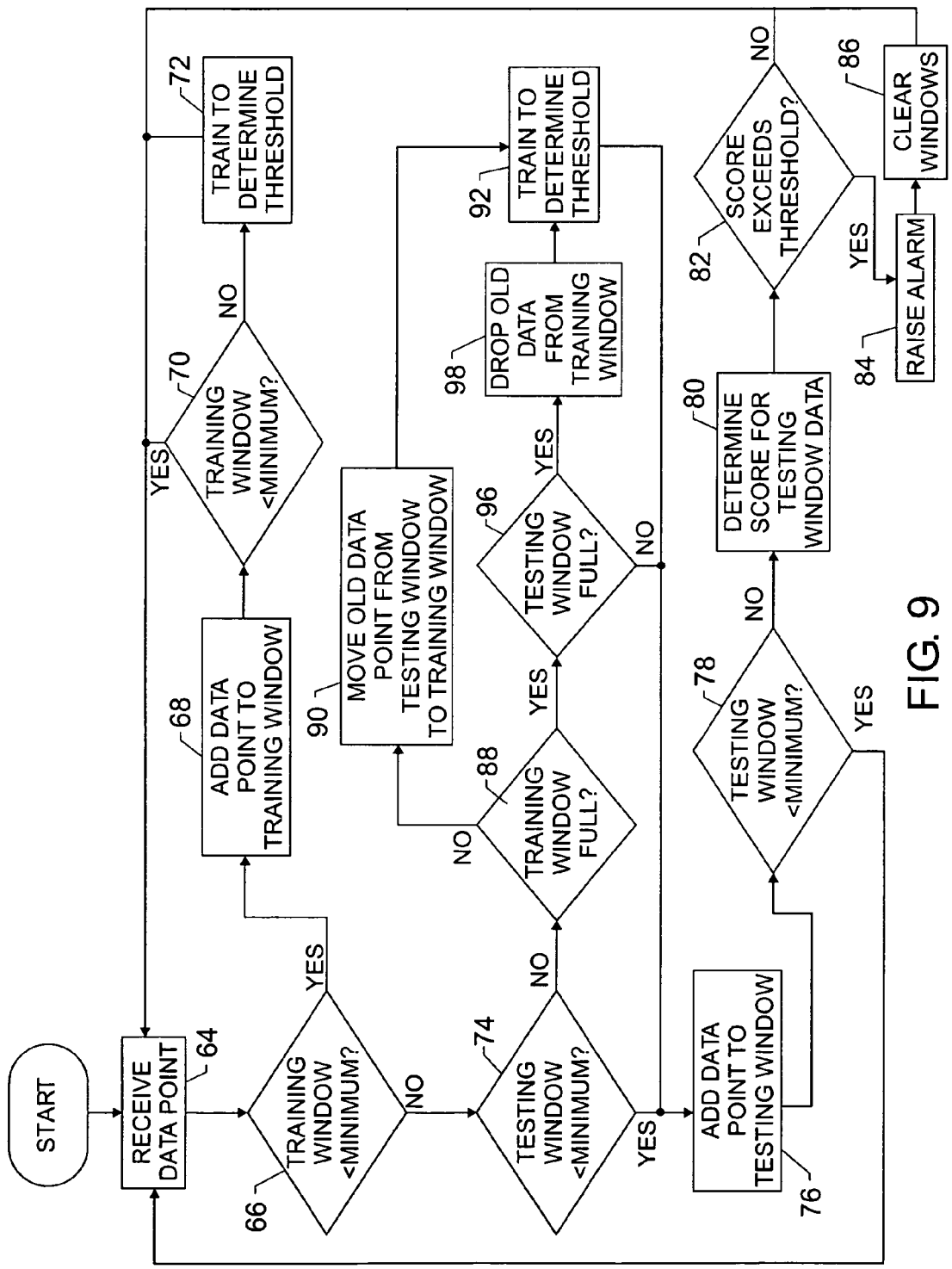
FIG. 9 is a flow chart illustrating another exemplary data management scheme in accordance with one embodiment of the invention.
Figure 10:
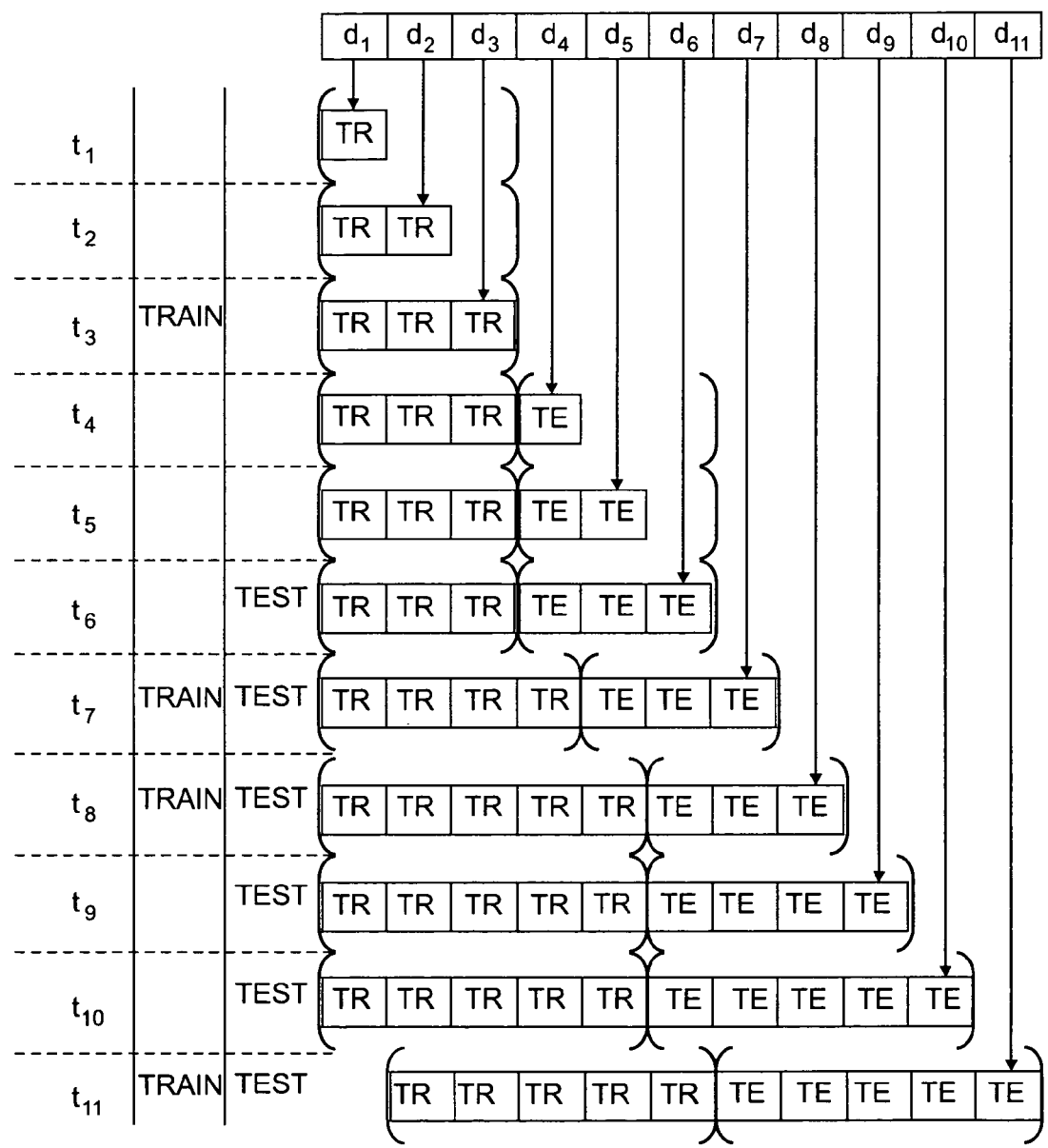
FIG. 10 is a timing diagram illustrating the exemplary data management scheme indicated in FIG. 9.

FIGS. 7-10 illustrate two exemplary schemes for managing the training window 16 and the testing window 18. Generally, FIGS. 7 and 8 illustrate a first technique wherein the training window 16 is initially filled to a minimum level such that the detector 22 can be trained, and then the testing window 18 is filled to a minimum such that testing can begin. Data from the data stream 16 continues to fill the testing window 18. Once the testing window 18 is full, the oldest data in the testing window 18 is moved to the training window 16 such that the threshold can be optimized. Once the training window 16 is full, the oldest data in the training window 16 is discarded. As described further below, this technique results in faster training and more data in the testing window 18 which advantageously provides better detection but disadvantageously may provide a less accurate initial threshold because the threshold is determined using less data. FIGS. 9 and 10 illustrate a technique wherein the training window is completely filled before the testing window is filled. Advantageously, the threshold is determined using more data and is thus more accurate, but disadvantageously there is less data in the testing window 18 used for detection.

Referring initially to FIG. 7, a first technique for managing the data being delivered to the data monitoring system 34 is illustrated. As previously described, the data monitoring system 34 receives a data stream 12 comprising a number of temporarily ordered data points. Accordingly, once the data producing system 14 begins transmitting the data stream 12 to the data monitoring system 34, a first data point is received at the data monitoring system 35 as illustrated in block 64. As can be appreciated, to adequately train the detector 22, it may be advantageous to use some minimum number of data points. Increasing the number of data points used to generate the sequences to calculate the threshold 36 increases the reliability and validity of the threshold. However, because the data stream is initially being used to determine a threshold 36, the actual testing of the data does not occur until after the initial threshold 36 is determined. Therefore, it may be advantageous to determine the initial threshold 36 as quickly as possible so that testing may begin, keeping in mind that setting the minimum in the training window 16 too low may reduce the validity and reliability of the initial threshold.

Accordingly, upon receipt of a data point, the data monitoring system 34 determines whether the amount of data in the training window 16 is currently less than the training window minimum (TRMIN), as indicated in block 66 of FIG. 7. The "training window minimum" ("TRMIN") simply refers to the minimum amount of data that will be collected in the training window 16 before the threshold 36 is determined and the detector 22 is trained. If the amount of data in the training window 16 is less than the TRMIN, the data point is added to the training window 16, as indicated in block 68. After adding the data point to the training window 16, the data monitoring system 34 determines whether the amount of data in the training window 16 has reached the TRMIN, as indicated in block 70. If the amount of data in the training window 16 has not reached the TRMIN, the subsequently received data points are used to fill the training window 16 to the TRMIN.

Once the TRMIN is reached, the detector 22 can be trained to determine the threshold 36, as indicated in block 72 of FIG. 7 and previously described with reference to FIGS. 1-6. Once the TRMIN is reached, successive data points may be delivered to the testing window 18. Accordingly, in the present exemplary embodiment once the detector 22 is trained and the next data point is received (block 64), the data monitoring system 34 will determine whether the testing window is full, as indicated in block 74 of FIG. 7. If the testing window 18 is not full, the data point is added to the testing window 18, as indicated in block 76. As with the training window minimum, a testing window minimum (TEMIN) is also implemented. The "testing window minimum" ("TEMIN") refers to the minimum number of data points that should be present in the testing window 18 before testing of the data in the testing window 18 begins. Accordingly, after a data point is added to the testing window 18, the data monitoring system 34 determines whether the TEMIN has been exceeded, as indicated in block 78. As indicated in FIG. 7, data points are added to the testing window 18 until the TEMIN is reached.

Once the TEMIN has been reached, the detector 22 begins testing the data in the testing window 18. Accordingly, after the TEMIN has been reached, the scoring function 38 is implemented to generate a score 60 (FIG. 6) for the sequence of data in the testing window 18, as indicated in block 80 of FIG. 7. The score 60 may then be compared to the threshold 36, as indicated in block 82. If the score 60 does not exceed the threshold 36, testing of the data in the testing window 18 continues. If the score 60 exceeds the threshold 36, an alarm 28 may be raised as previously described and as indicated in block 84. In one exemplary embodiment, after raising the alarm 28, the data monitoring system 34 may continue testing and continue sounding the alarm 28 until the detector 22 determines that the data is again unchanging. Alternatively, once the alarm 28 is raised, the training window 16 and the testing window 18 may be cleared, as indicated in block 86, and the data monitoring system 34 may return to the beginning of the testing process, including the determination of the initial threshold.

As will be illustrated further in FIG. 8, data may continue to fill testing window 18 and the data may continue to be tested by the detector 22 until the testing window 18 is full. In accordance with the present exemplary embodiment, once the testing window 18 is full, the oldest data in the testing window 18 can be used to "retrain" the detector 22 (i.e., optimize the threshold 36 by determining a new threshold 36 based on new sequences 24 generated using the data in the training window 16, including the newly added data from the testing window 18). Accordingly, once the testing window 18 is full, the data monitoring system 34 determines whether the training window 16 is full, as indicated in block 88. If the training window 16 is not full, the oldest data in the testing window 18 is moved from the testing window 18 to the training window 16, as indicated in block 90 of FIG. 7. As can be appreciated, the additional data may be implemented by the trainer 20 to adjust the initial threshold 36 using the additional data in the training window 16 to further optimize the threshold 36. Accordingly, using the roll-over data from the testing window 18, a new threshold 36 may be calculated as indicated in block 92. If the training window 16 is full, the oldest data may be discarded from the training window 16, as indicated in block 94 and the oldest data in the testing window 18 is moved to the training window 16 (block 90). The data monitoring system 34 may continue to operate as described above as long as there is data to monitor.

FIG. 8 is a simplified example of the exemplary scheme illustrated in FIG. 7. In the present example, the data stream 12 includes a number of data points $d_1$-$d_{11}$ which represent temporarily ordered values received from the data producing system 14. For simplicity, each of the training window minimum (TRMIN) and the testing window minimum (TEMIN) equals 3. That is to say that each of the training window 16 and the testing window 18 reaches a corresponding minimum, TRMIN and TEMIN, respectively, when three data points are stored therein. Further, each of the training window 16 and the testing window 18 are full once the respective window has 5 data points stored therein. As can be appreciated, these values are used for illustrative purposes only.

As previously described in FIG. 7, the training window 16 receives data points until the TRMIN is reached. Here, TRMIN=3, and therefore, the training window 16 receives data points $d_1$-$d_3$. Once the TRMIN is attained (here at time $t_3$), the detector 22 is trained using sequences generated from data points $d_1$-$d_3$, as previously described.

After training, the subsequent data points in the data stream 12, here $d_4$-$d_6$, are stored in the testing window 18. Once the TEMIN is reached (i.e., three data points are stored in the testing window 18), here at time $t_6$, testing begins to determine whether the data in the testing window 18 is changing. Data testing continues until the testing window 18 is full. In the present example, the testing window 18 is full when it contains 5 data points, here at time $t_8$. Once the testing window 18 is full, upon receipt of the next data point (here at time $t_9$), the oldest data in the testing window (initially data point $d_4$) may be transmitted to the training window 16 to further optimize the threshold 36. This process continues until the training window 16 is full (here at time $t_{10}$). Once the training window 16 is full, the oldest data in the training window (here, the data point $d_1$) is discarded, as indicated at here at time $t_{11}$.

Referring now to FIG. 9, an alternate exemplary technique for managing the data being delivered to the data monitoring system 34 is illustrated. As previously described with reference to FIG. 7, the data monitoring system 34 receives a data stream 12 comprising a number of temporarily ordered data points. Each of the blocks 64-88 described with reference to FIG. 7 are identical to those illustrated in FIG. 9. In the present exemplary embodiment, once the data in the testing window reaches the TEMIN, the oldest data in the testing window 18 is transferred to the training window 16, such that the detector 22 can be retrained. In the present exemplary embodiment, the training window 16 is filled first. Accordingly, once the testing window 18 reaches the TEMIN, the data monitoring system 34 delivers data to the training window 16 and with each delivered data point, determines whether the training window 16 is full, as indicated in block 88. If the training window 16 is not full, the oldest data in the testing window 18 is moved from the testing window 18 to the training window 16, as indicated in block 90. As can be appreciated, the additional data may be implemented by the trainer 20 to adjust the initial threshold 36 using the additional data in the training window 16 to further optimize the threshold 36. Accordingly, using the roll-over data from the testing window 18, a new threshold 36 may be calculated as indicated in block 92. If the training window 16 is full, the trainer 20 determines whether the testing window 18 is full, as indicated in block 96. If the testing window 18 is not full, the data point is added to the testing window 18 (block 76). If the testing window 18 is full, the oldest data point is discarded from the training window 16, as indicated by block 98, the oldest data point from the testing window 18 is moved to the training window 16 and the newest data point is added to the testing window 18.

FIG. 10 is a simplified example of the exemplary scheme illustrated in FIG. 9. In the present example, the data stream 12 includes a number of data points $d_1$-$d_{11}$ which represent temporarily ordered values received from the data producing system 14. For simplicity, each of the training window minimum (TRMIN) and the testing window minimum (TEMIN) equals 3. Further, each of the training window 16 and the testing window 18 are full once the respective window has 5 data points stored therein.

As previously described in FIG. 9, the training window 16 receives data points until the TRMIN is reached. Here, TRMIN=3, and therefore, the training window 16 receives data points $d_1$-$d_3$. Once the TRMIN is attained (here at time $t_3$), the detector 22 is trained using sequences generated from data points d-$d_3$, as previously described.

After training, the subsequent data points in the data stream 12, here $d_4$-$d_6$, are stored in the testing window 18. Once the TEMIN is reached (i.e., three data points are stored in the testing window 18), here at time $t_6$, testing begins to determine whether the data in the testing window 18 is changing. When the next data point $d_7$ is received, here at time $t_7$, the oldest data in the testing window 18 (here data point $d_4$) is moved to the training window and the new data point $d_7$ is stored in the testing window 18. At this point, both testing and retraining are being implemented. This process continues until the training window 16 is full. In the present example, the training window 16 is full when it contains 5 data points, here at time $t_8$. Once the training window 16 is full, upon receipt of the next data point (here at time $t_9$), the next data point is simply stored in the testing window 18. This continues until the testing window 18 is full (here at time $t_{10}$). Once the testing window 18 is full, the oldest data in the training window (here, the data point $d_1$) is discarded, the oldest value in the testing window 18 is moved to the training window 16, and the newest data point (here data point $d_{11}$), is stored in the testing window 18, as indicated at here at time $t_{11}$.

As can be appreciated, other methods for window management may be used. For example, the sizes of the training window 16 and testing window 18 may grow together at some proportional rate from their respective minima until their respective maxima are reached. Also, the training window 16 and testing window 18 may overlap or there may be temporarily unused data values between them.

Simply detecting changes may be sufficient for certain applications. However, the amount of time it takes to detect a change may be an important aspect in other applications. That is to say that it may be advantageous to detect changes in a timely manner for applications in which the benefit of detecting a change decays over time. At some point in time, it may be no better to detect that something changed than it is to fail to detect that it changed. For instance, if the monitoring system 34 is being implemented to monitor a patient's temperature, the data stream 12 may comprise temperatures sampled every five minutes. As the patient's temperature rises, as depicted by increases in the successive values in the data stream 12, the monitoring system 34 becomes more confident that there is a problem. Initially, the alarm 28 may not be triggered. As some point (when the temperature in the data stream crosses the threshold 36), the alarm 28 may be triggered. However, if the amount of time it takes to detect the change and trigger the alarm 28 is too long, the patient could die, thereby mitigating any advantages of even detecting the change. Accordingly, the data monitoring system 34 may be advantageously configured to raise various alarm levels or take various actions depending on the detection time, as previously described.

In accordance with the embodiments described above, for any sequence 24 generated from the data in the training window 16, a false positive rate may be predicted and the value for the sensitivity parameter 26 or threshold 36 used to train the detector 22 may be determined based on the acceptable false positive rate (false alarm rate). However, in certain applications, it may be advantageous to consider more than the false positive rate in determining an optimum threshold 36. For instance, it may be advantageous to determine how good the system is at detecting actual changes, in terms of percentage of actual changes detected, as well as how long it takes to detect the changes. As previously described, the data that was used to train the detector 22 is assumed to be from the same statistical distribution (or one which whose deviation is explicitly not to be considered significant) and therefore, should not cause the detector 22 to signal a detected change. Accordingly, to determine how good the system is at detecting changes and using this information to optimize the threshold 36, one or more positive sequences (sequences representative of the type of change whose detection is desired) may be generated by the data monitoring system 34. The same methods described with respect to FIGS. 4 and 5 for generating negative sequences are applicable for the generation of positive sequences, although the distribution of changes to be induced will be different. In this case, the distribution of changes to be induced should reflect the expected frequency of occurrence in the running system of various magnitudes of change that are considered worth detecting. For this reason, this distribution is also referred to as a distribution of expected changes. By generating positive sequences, the behavior of the detector 22, when encountering these changes, can be taken into account in selecting a value for the sensitivity parameter 26.

The distribution of expected changes will typically be parametric in form, although the statistical distribution that the change is drawn from need not be of the same type as the statistical distribution used to characterize the data in the training window 16. By way of example, the detector 22 may be configured to detect a change in the mean and that a significant change (i.e., a change that should be detected) is a change whose magnitude is more than one half of the current observed standard deviation. Further an increase in the mean is considered to be twice as likely as a decrease in the mean and all changes up to two standard deviations are considered equally likely. The distribution of expected changes would therefore select a change that represents an increase of a magnitude between 1.0 and 1.5 standard deviations $\frac{2}{3}$ of the time. Such a distribution might be implemented as a single density function or as a pair of uniform distributions, with a separate distribution (in this case a binomial distribution with probability $\frac{2}{3}$) used to choose between them. This can be generalized to multiple distributions, each potentially of a different type. The distribution of expected changes may be asserted by the user or may be inferred from analysis of historical data on the data producing system 14 or other systems asserted to be similar. It may also be modified as the monitoring system 10 executes and the detector 22 signals detection of changes to more accurately reflect the observed distribution of salient changes.

The generated positive sequences are among the sequences 24 used by the trainer 20 to derive the value for the sensitivity parameter 26 or threshold 36. In this case, however, if the detector 22 is configured to signal detection when presented with a positive sequence, it is counted as a true positive rather than a false positive and if it fails to signal detection within a reasonable amount of time, it is counted as a false negative. The scoring function 38 is used to obtain a score 40 associated with this sequence. Note that for the determination of the true positive rate associated with a given score, it is advantageous that the score be the minimum, rather than the maximum, of the values returned by the scoring function 38 when presented with subsequences of the sequence. As with the technique of using the acceptable rate of false positives to determine a threshold 36, as previously described with reference to FIGS. 2 and 3, the scores 40 can be arranged by magnitude such that a threshold 36 can be selected based on a highest tolerable false negative rate (equivalently, a lowest desirable true positive rate). Because the sequences are positive, anything above each threshold 36 is a true positive, and anything below the threshold 36 is a false negative. For every value of the threshold 36, the detector 22 is able to determine what percentage of those scores are below the threshold 36 and therefore false negatives, and the threshold 36 selected corresponds to the percentile of the desired false negative rate. For example, if the highest tolerable false negative rate is 5%, then the score 40 at the $5^{th}$ percentile is chosen.

By using both negative and positive generated sequences 24, for every score seen, a false positive rate and a true positive rate may be determined, and the false positive rate and true positive rate for other scores may be obtained by interpolation and extrapolation. The false positive rate and the true positive rate may be implemented to determine an optimal threshold 36. In accordance with one exemplary technique, a receiver operating characteristic (ROC) curve may be used to implement a cost/benefit-type analysis to determine the threshold 36. As can be appreciated, in accordance with ROC techniques, the true positive rate may be plotted against the false positive rate for every possible threshold 36, and an optimized threshold 36, maximizing accuracy, may be selected. Approximations may be made to assess benefits or values associated with preventing a false positive rate and preventing a false negative rate. For instance, preventing a false positive may be valued at one hundred dollars ($100), for example, and preventing a false negative may be valued at one thousand dollars ($1000). Given these values, along with an estimate of the frequency of events to detect, ROC analysis provides a mapping tool for every possible value, from which an optimal threshold 36 may be selected. As can be appreciated, other analysis tools may also be implemented using interesting/changing distributions to determine an optimized threshold 36. Note that it is not necessary, and in general will not be desirable for the positive and negative sequences to be the same length. In general, it will be desirable for the length of a positive sequence to be such that the length after the fault is inserted is long enough that lack of detection will be considered a false negative as opposed to a long-delayed true positive.

In some embodiments, rather than a simple cost/benefit associated with a false negative or true positive, a utility function is provided, which gives a cost or benefit for signaling detection at each point following the actual event to be detected. Typically this will be a monotonic function, with costs increasing and benefits decreasing as time goes on until an asymptotic level is reached corresponding to the cost of a false negative. By way of example, an event might cost $20 if detected any time within the first five minutes, and the cost might increase linearly to $100 over the next 55 minutes and remain at $100 if not detected at all within the first hour.

To make use of such a utility function, a number of positive sequences are constructed as previously described, but now separate collections of scores 40 are kept corresponding to the distance past the insertion point for each simulated testing window passed to the scoring function 38, with the score 40 for any sequence at a particular point being the minimum of the value returned by the scoring function 38 for a simulated testing window 18 ending on that point and the values returned on all prior windows. From these collections, a true positive rate can be computed, as described above, for each score value at each point, and from these rates, one can compute an expected positive cost for each score, taking into account only positive sequences. This can be combined with the expected negative cost for the score 40, computed from the score's false positive rate and the false positive cost, and the expected frequency of positive events to obtain an overall cost for each score 40. The score 40 with the minimum expected cost may then be chosen to be used as the threshold 36.

In an alternative embodiment, the utility function may assess different costs depending on the magnitude of the change detected. On one hand, it may be more important to quickly notice larger changes, as they may imply more urgent situations. On the other hand, in a system designed to assist humans in noticing hard-to-see changes, it might be advantageous to reward the detection of smaller changes, relying on users to detect the obvious large ones. To take magnitude of change into account when computing expected cost, it suffices to have each element of each collection of scores 40 associated with the magnitude of the change induced into the particular sequence 24 with which the score 40 is associated.

The foregoing descriptions have assumed that there is a single data stream 12, but in some embodiments there may be multiple temporally-correlated data streams 12, not necessarily sampled at the same rate. As can be appreciated, the techniques described above may be used to determine values for one or more sensitivity parameters 26 for each of the data streams 12. For example, when monitoring a storage system, there might be separate streams for the average response time and average queue length. In such a system, each data stream 12 is associated with its own detector 22 and set of alarms 28, although in both cases, these may be shared between the data streams 12. In addition there are system-level alarms, each of which will be raised if a "sufficient set" of lower-level alarms 28 are raised, perhaps within a given time window. This notion of sufficient set does not merely mean a minimum number. The alarms associated with some data streams 28 may be weighted more heavily than those associated with others, and there may be more arbitrary combinations (e.g., "these two, three of those five, or any of those four along with this one"), for example.

The above-described base functions comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A processor-based method comprising:
   receiving a data stream comprising a plurality of temporally ordered data points;
   generating a plurality of sequences from a first portion of the data stream; and
   training a detector by determining a value for a sensitivity parameter using the plurality of sequences.

2. The method, as set forth in claim 1, comprising running the detector on a second portion of the data stream.

3. The method, as set forth in claim 2, wherein running the detector comprises:
   generating a score corresponding to the second portion of the data stream;
   comparing the score to the determined value for the sensitivity parameter; and
   signaling detection of an interesting event in the data stream if the score crosses the sensitivity parameter.

4. The method, as set forth in claim 1, wherein training the detector by determining the value for the sensitivity parameter comprises selecting the value for the sensitivity parameter based on a target level for an estimated performance characteristic of the detector.

5. The method, as set forth in claim 1, wherein training the detector by determining the value for the sensitivity parameter comprises:
   generating a score for each of the plurality of sequences; and
   selecting the value for the sensitivity parameter based on the scores.

6. The method, as set forth in claim 1, wherein generating the plurality of sequences comprises:
   inferring a statistical distribution of a known type to characterize the first portion of the data stream; and
   generating the plurality of sequences from the statistical distribution.

7. The method, as set forth in claim 6, wherein the statistical distribution is a discrete distribution containing data points from the first portion of the data stream, and wherein generating the plurality of sequences from the statistical distribution comprises selecting data points from the discrete distribution.

8. The method, as set forth in claim 6, wherein inferring a known type of distribution comprises determining a set of parameters corresponding to the known type of statistical distribution.

9. The method, as set forth in claim 1, wherein generating the plurality of sequences comprises:
   selecting a change based on a distribution of changes; and
   generating a changed sequence based on the selected change.

10. The method, as set forth in claim 1, wherein determining the value of the sensitivity parameter comprises determining a plurality of values for the sensitivity parameter using the plurality of sequences.

11. The method, as set forth in claim 10, wherein determining one of the plurality of values for the sensitivity parameter comprises calculating a transformation of a second of the plurality of values for the sensitivity parameter.

12. The method, as set forth in claim 1,
   wherein receiving a data stream comprises receiving a plurality of data streams;
   wherein generating the sequences comprises generating a respective plurality of sequences from a respective first portion of each of the plurality of data streams; and
   wherein determining the sensitivity parameter comprises determining a respective sensitivity parameter for each of the plurality of sequences.

13. The method, as set forth in claim 1, wherein determining the value for the sensitivity parameter comprises determining the value for the sensitivity parameter based at least partially on cost parameters.

14. The method, as set forth in claim 12, comprising raising an alarm when a respective detector signals detection when parameterized by the respective sensitivity parameter and run on a respective second portion of a sufficient set of data streams.

15. A processor-based method comprising:
    training a detector using a plurality of sequences generated from a first portion of a data stream, wherein the detector is configured to detect an interesting event in the data stream; and
    testing a second portion of the data stream using the trained detector.

16. The method, as set forth in claim 15, comprising transforming the data stream before training the detector.

17. The method, as set forth in claim 15, comprising:
    generating a plurality of sequences from a third portion of the data stream; and
    retraining the detector using the plurality of sequences generated from the third portion of the data stream.

18. The method, as set forth in claim 15, wherein training the detector comprises determining one or more sensitivity parameters from the plurality of sequences.

19. The method, as set forth in claim 18, wherein testing the second portion of the data stream comprises:
    generating a score associated with the second portion of the data stream; and
    comparing the score with the one or more sensitivity parameters.

20. The method, as set forth in claim 15, comprising raising an alarm only if an interesting event is detected in the data stream a predetermined number of times within a predetermined amount of time.

21. The method, as set forth in claim 15, comprising raising an alarm if the detector detects an interesting event in the data stream.

22. A system comprising:
    a trainer configured to generate a plurality of sequences from a first portion of a data stream and further configured to determine one or more sensitivity parameters based on the sequences; and
    a detector configured to detect an interesting event in the data stream using the one or more sensitivity parameters.

23. The system, as set forth in claim 22, comprising an alarm coupled to the detector and configured to engage when an interesting event in the data stream is detected.

24. The system, as set forth in claim 22, comprising an input device coupled to the trainer, wherein the device is configured to allow a user to set cost parameters for use in determining the one or more sensitivity parameters.

25. A computer-readable medium comprising computer instructions for:
    generating a plurality of sequences from a first portion of a data stream;
    determining a sensitivity parameter using the plurality of sequences; and
    training a detector to detect an interesting event in the data stream using the sensitivity parameter.

26. The computer-readable medium, as set forth in claim 25, further comprising computer instructions for:
    generating a score corresponding to a second portion of the data stream; and
    signaling detection of an interesting event in the data stream if the score crosses the sensitivity parameter.

27. A system comprising:
    means for generating a plurality of sequences from a first portion of a data stream;
    means for determining a sensitivity parameter based on the plurality of sequences; and
    means for detecting an interesting event in a second portion of the data stream using the sensitivity parameter.

28. The system, as set forth in claim 27, wherein means for determining comprises means for generating a plurality of interesting sequences from the data stream, wherein the interesting sequences have a different statistical distribution than a statistical distribution of the first portion of the data stream.

29. The system, as set forth in claim 27, wherein means for detecting comprises means for detecting an interesting event in a parameter of the plurality of distributions.

30. The system, as set forth in claim 27, comprising means for injecting a change into the first portion of the data stream.

* * * * *